(12) United States Patent
Duan et al.

(10) Patent No.: US 11,472,442 B2
(45) Date of Patent: Oct. 18, 2022

(54) MAP CONSISTENCY CHECKER

(71) Applicant: Zoox, Inc., Foster City, CA (US)

(72) Inventors: Pengfei Duan, Newark, CA (US);
James William Vaisey Philbin, Palo Alto, CA (US); Cooper Stokes Sloan, San Francisco, CA (US); Sarah Tariq, Palo Alto, CA (US); Feng Tian, Foster City, CA (US); Chuang Wang, Sunnyvale, CA (US); Kai Zhenyu Wang, Foster City, CA (US); Yi Xu, Pasadena, CA (US)

(73) Assignee: Zoox, Inc., Foster City, CA (US)

( * ) Notice: Subject to any disclaimer, the term of this patent is extended or adjusted under 35 U.S.C. 154(b) by 146 days.

(21) Appl. No.: 16/856,826

(22) Filed: Apr. 23, 2020

(65) Prior Publication Data
US 2021/0331703 A1 Oct. 28, 2021

(51) Int. Cl.
*B60W 60/00* (2020.01)
*G01S 17/86* (2020.01)
(Continued)

(52) U.S. Cl.
CPC .... *B60W 60/0025* (2020.02); *B60W 60/0027* (2020.02); *G01C 21/32* (2013.01);
(Continued)

(58) Field of Classification Search
CPC .... G01C 21/32; G01C 21/28; G01C 21/3815; G01C 21/3833; G01S 17/86; G01S 17/89;
(Continued)

(56) References Cited

U.S. PATENT DOCUMENTS

| 9,612,123 B1 | 4/2017 | Levinson et al. |
| 10,353,390 B2 | 7/2019 | Linscott et al. |

(Continued)

FOREIGN PATENT DOCUMENTS

| CN | 110968094 A | * | 4/2020 | ............. G01C 21/30 |
| EP | 3470789 A1 | * | 4/2019 | ............. B60W 30/12 |

(Continued)

OTHER PUBLICATIONS

De Silva et al.; Fusion of LiDAR and Camera Sensor Data for Enviornment Sensing in Driverless Vehicles; 2017; Google Scholar (accessed Aug. 15, 2022) (Year: 2017).*

(Continued)

*Primary Examiner* — Michael J Zanelli
(74) *Attorney, Agent, or Firm* — Lee & Hayes, P.C.

(57) ABSTRACT

Techniques relating to monitoring map consistency are described. In an example, a monitoring component associated with a vehicle can receive sensor data associated with an environment in which the vehicle is positioned. The monitoring component can generate, based at least in part on the sensor data, an estimated map of the environment, wherein the estimated map is encoded with policy information for driving within the environment. The monitoring component can then compare first information associated with a stored map of the environment with second information associated with the estimated map to determine whether the estimated map and the stored map are consistent. Component(s) associated with the vehicle can then control the object based at least in part on results of the comparing.

19 Claims, 5 Drawing Sheets

(51) Int. Cl.
*G01C 21/32* (2006.01)
*G05D 1/00* (2006.01)
*G05D 1/02* (2020.01)

(52) U.S. Cl.
CPC ............ *G01S 17/86* (2020.01); *G05D 1/0088* (2013.01); *G05D 1/0214* (2013.01); *G05D 1/0223* (2013.01); *G05D 1/0274* (2013.01); *B60W 2420/42* (2013.01); *B60W 2420/52* (2013.01); *B60W 2552/05* (2020.02); *B60W 2552/53* (2020.02); *B60W 2555/60* (2020.02); *G05D 2201/0213* (2013.01)

(58) Field of Classification Search
CPC .. G01S 17/931; G05D 1/0088; G05D 1/0274; G05D 1/0214; G05D 1/0223; G05D 2201/0213; B60W 2420/42; B60W 2552/53; B60W 2555/60; B60W 60/0025; B60W 60/0027; B60W 60/0018; B60W 2420/52; B60W 2552/05; B60W 2556/20; B60W 2556/35; B60W 2556/40
See application file for complete search history.

(56) References Cited

U.S. PATENT DOCUMENTS

| | | |
|---|---|---|
| 2008/0106436 A1 | 5/2008 | Breed |
| 2009/0228204 A1 | 9/2009 | Zavoli |
| 2013/0278443 A1 | 10/2013 | Rubin et al. |
| 2018/0364734 A1 | 12/2018 | Ferguson |
| 2019/0033459 A1* | 1/2019 | Tisdale .................. G06V 20/56 |
| 2019/0227545 A1* | 7/2019 | Yoo ........................ G01C 21/32 |
| 2019/0332118 A1 | 10/2019 | Wang et al. |
| 2020/0110416 A1 | 4/2020 | Hong et al. |
| 2020/0240790 A1 | 7/2020 | Behrendt et al. |
| 2021/0180959 A1* | 6/2021 | Muto ................... G08G 1/0129 |

FOREIGN PATENT DOCUMENTS

| | | | |
|---|---|---|---|
| JP | 2008033439 A | 2/2008 | |
| JP | 2019185599 A | 10/2019 | |
| JP | 2020038634 A | 3/2020 | |
| WO | WO-2010006669 A1 * | 1/2010 | ............ G01C 21/32 |
| WO | WO2019073360 A1 | 4/2019 | |

OTHER PUBLICATIONS

PCT Search Report and Written Opinion for PCT App No. PCT/US21/27484, dated Jul. 22, 2021, 9 pgs.
U.S. Appl. No. 16/586,620, filed Sep. 27, 2019, Cai, et al., "Supplementing Top-Down Predictions With Image Features", 47 pages.
PCT Search Report and Written Opinion dated Jul. 13, 2022 for PCT application No. PCT/US22/23415, 12 pages.

* cited by examiner

MAP CONSISTENCY CHECKER

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may make decisions while traversing an environment to ensure safety for passengers and surrounding persons and objects. A variety of sensors may be used to collect information about objects in the surrounding environment, which may be used by the autonomous vehicle to make decisions on how to traverse the environment. Furthermore, in some examples, the autonomous vehicle can utilize map(s) of the surrounding environment for making decisions on how to traverse the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
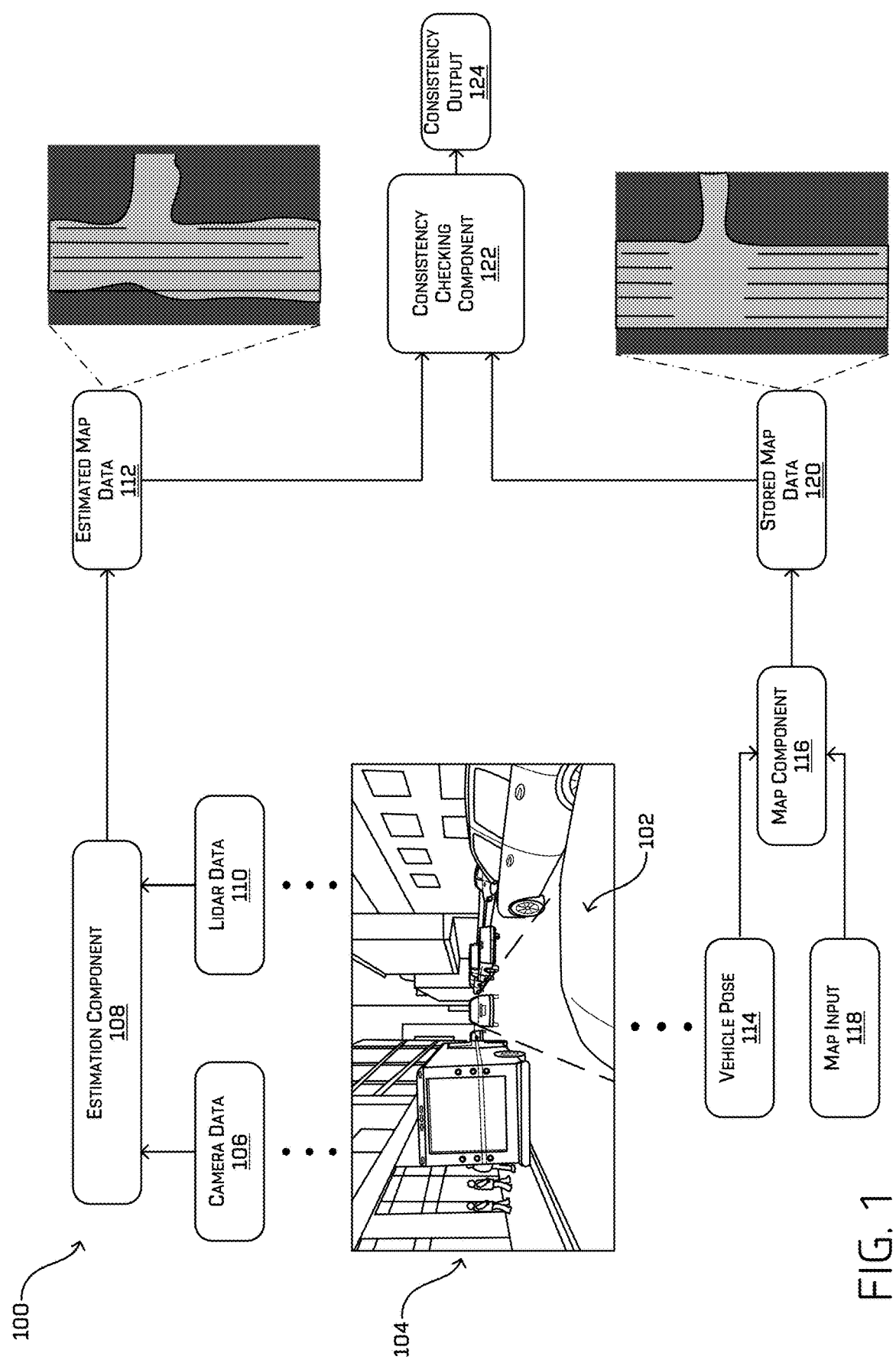
FIG. 1 illustrates an example process for determining whether a stored map is consistent with an estimated map, as described herein.

Techniques described herein are directed to determining whether a stored map of an environment, or data output based on the stored map, is reliable such that it can be utilized by a vehicle, such as an autonomous vehicle, for making decisions on how to traverse the environment. In an example, the autonomous vehicle can utilize sensor data associated with the environment to generate an estimated map of the environment (e.g., in near real-time). The autonomous vehicle can then compare the estimated map with the stored map of the environment—or information derived from each of the maps—to determine whether the stored map is consistent with the estimated map. The autonomous vehicle can utilize output(s) from the comparison to monitor the stored map and/or for making decisions on how to traverse the environment. In some examples, if the stored map is not consistent with the estimated map, the autonomous vehicle can decelerate and/or stop. In some examples, if the stored map is not consistent with the estimated map, the autonomous vehicle can use the estimated map instead of the stored map for making decisions on how to traverse the environment, at least until the inconsistency is resolved.

Techniques described herein can be useful for monitoring stored maps to ensure such stored maps and/or information derived therefrom is reliable. That is, maps are often generated and stored (or, otherwise generated remotely from and accessible by an autonomous vehicle) for subsequent use onboard autonomous vehicles (i.e., while the autonomous vehicles are driving). Such maps can be used by autonomous vehicles for making decisions on how to traverse environments. Environments can change and, in some examples, stored maps may not be updated to reflect such changes. For instance, an environment can change based on emergent route changes, construction zones, ground condition changes, etc. This can cause information derived from the stored map to be inaccurate. That is, if a stored map is not accurate, an autonomous vehicle relying on such a stored map can make decisions that may not be safe. As an example, if a stored map shows that a portion of an environment is a drivable surface (e.g., associated with an "on-road" indication) when the portion of the environment is not a drivable surface, the autonomous vehicle can end up driving on a surface that isn't actually drivable. As another example, if a stored map shows a driving lane in a particular position and the driving lane has been repainted or otherwise is in a different position, the autonomous vehicle can end up driving in multiple lanes unintentionally.

As such, it is imperative that stored maps are reliable so that autonomous vehicles can make decisions while traversing an environment to ensure safety for passengers and surrounding persons and objects. Techniques described herein avail methods, apparatuses, and systems to enable determining whether a stored map of an environment is reliable, by comparing the stored map to an estimated map generated based at least in part on sensor data received in near real-time from sensor component(s) onboard an autonomous vehicle. Techniques described herein can be performed by a monitoring component that is independent from other components onboard autonomous vehicles that estimate pose. Such techniques can utilize different sensor modalities (e.g., camera and lidar) to offer redundancy in making monitoring decisions. That is, techniques described herein relate to independently performed, redundant techniques for monitoring consistency between stored maps and estimated maps to ensure that other components onboard autonomous vehicles (e.g., a planner component) can safely rely on the stored maps and/or information derived therefrom to make decisions.

The techniques described herein can be implemented in a number of ways. Example implementations are provided below with reference to the following figures. Example implementations are discussed in the context of autonomous vehicles; however, the methods, apparatuses, and components described herein can be applied to a variety of components (e.g., a sensor component or a robotic platform), and are not limited to autonomous vehicles. In one example, the techniques described herein may be utilized in driver-controlled vehicles in which such a component may provide an indication to a driver of the vehicle. In another example, the techniques can be utilized in an aviation or nautical context, or in any component involving objects or entities that may be associated with behavior that is unknown to the component. In some examples, the techniques can be utilized in contexts outside of autonomous vehicles. Furthermore, the techniques described herein can be used with real data (e.g., captured using sensor(s)), simulated data (e.g., generated by a simulator), or any combination of the two.

FIG. 1 illustrates an example process 100 for determining whether a stored map is consistent with an estimated map, as described herein. In at least one example, the example process 100 can be performed by one or more computing devices onboard a vehicle 102, such as an autonomous vehicle. In at least one example, the computing device(s) can include components for controlling the vehicle 102. Additional details associated with the vehicle 102 and the computing device(s) and/or component(s) associated therewith are described below with reference to FIG. 3.

In at least one example, the vehicle 102 can be associated with one or more sensor components. In at least one example, the sensor component(s) can capture data associated with an environment 104 surrounding the vehicle 102. In at least one example, the sensor component(s) can include lidar sensors, radar sensors, ultrasonic transducers, sonar sensors, location sensors (e.g., global positioning component (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), time of flight (ToF) sensors, etc. The sensor component(s) can generate sensor data, which can include, but is not limited to, lidar data, radar data, ultrasonic transducer data, sonar data, location data (e.g., global positioning component (GPS), compass, etc.), inertial data (e.g., inertial measurement units data, accelerometer data, magnetometer data, gyroscope data, etc.), camera data (e.g., RGB data, IR data, intensity data, depth data, etc.), wheel encoder data, microphone data, environment sensor data (e.g., temperature sensor data, humidity sensor data, light sensor data, pressure sensor data, etc.), ToF sensor data, etc.

In at least one example, cameras onboard the vehicle 102 can provide camera data 106 (e.g., image(s) captured by camera(s)) to an estimation component 108. In at least one example, the camera data 106 can include images from various cameras that are disposed about the vehicle 102 to capture various angles of the environment 104 within which the vehicle 102 is positioned. For example, in at least one example, the camera data can include images from eight different cameras which can capture eight different portions of the environment 104.

In at least one example, lidar sensors onboard the vehicle 102 can provide lidar data 110 to the estimation component 108. In at least one example, the lidar data 110 can be associated with point clouds in a grid (e.g., with designated dimensions such as 320×192). In at least one example, the lidar data can be associated with one or more features, which can include grid occupancy (e.g., a binary and/or probability a portion of the environment is occupied), grid density, maximum_z (max_z) (e.g., a highest lidar point on a z-axis of a multi-dimensional coordinate system), maximum_z divided into two or more bins (max_z divided into bins), minimum_z (min_z) (e.g., a lowest lidar point on the z-axis), intensity at minimum_z (min_z), etc.

In at least one example, the estimation component 108 can include one or more components for processing the camera data 106, the lidar data 110, and/or other sensor modalities associated with the sensor component(s) onboard the vehicle 102. In an example, a lidar processing component can receive the lidar data 110 and can process the lidar data 110, for example, using one or more models (e.g., using a neural network, such as a residual neural network). In an example, an image processing component can receive the camera data 106 and can process the camera data 106, for example, using one or more models (e.g., using one or more neural networks, such as a residual neural network, a fully connected neural network, or the like), one or more image processing techniques, a combination of the foregoing, or the like. Additional details are provided below.

In at least one example, the lidar processing component can generate a top-down representation of an environment 104 based at least in part on the lidar data 110. For instance, the lidar processing component can accumulate features of objects in the environment 104 over a projected voxel area. The lidar processing component may combine the accumulated features into voxel features, which represent the features in the three-dimensional space of the projected voxel area. In some examples, the lidar processing component may collapse the voxel features along the height dimension to generate orthographic features. The orthographic features, therefore, represent dimensions and/or characteristics of an object in a two-dimensional plane from the three-dimensional voxel features. The lidar processing component may output the orthographic features of the object as part of a top-down representation of the environment 104.

As described above, in an example, an image processing component associated with the estimation component 108 can receive the camera data 106 and can process the camera data 106, for example, using one or more models (e.g., using one or more neural networks, such as a residual neural network, a fully connected neural network, or the like), one or more image processing techniques, combinations of the foregoing, or the like.

In at least one example, the image processing component can generate an image feature representation based at least in part on the camera data 106, where the image feature representation is from a top-down perspective (e.g., a top-down image representation). In an example, an image processing component can receive the camera data 106 and can resize each of the images to a designated size (e.g., 320× 192×3). The image processing component can then process the resized images using one or more models. For example, the image processing component can encode the resized images (e.g., using a neural network, such as a residual neural network) and use a fully connected neural network to convert images from a projection view to an orthogonal view. Then, the image processing component can decode the resized images (e.g., using a neural network, such as a residual neural network).

In examples, the image feature representation may be based on the camera data 106 of the environment 104 captured by cameras disposed on the vehicle 102. In at least one example, the image processing component can encode the resized images to generate image feature representations. An image feature representation can include indications of pedestrian(s) (which may also include information related to the type of object, and/or movement information associated with the pedestrian(s) embedded in the image feature representation at the location of the indication), vehicle(s) (which may also include information related to the respective vehicle(s) such as the type of object, and/or movement information associated with the respective vehicle(s) embedded in the image feature representation at the locations of the indications), and the like. Similarly, the image feature representation can be embedded with information regarding speed limits, lane lines, lane widths, lane ends, stop lines, traffic lights, traffic light states, and the like.

Although the top-down representation generated based on the lidar data 110 and the image feature representation generated based on the camera data 106 are capable of including information of similar types and values, in some cases, the information embedded in the two different representations will be different. In at least one example, the estimation component 108 can combine the top-down representation with the image feature representation. In some examples, the combined output can include information from both the top-down representation and the image feature representation regarding object type, bounding boxes, movement information, and the like. In at least one example, an average can be computed based at least in part on the output (e.g., representation and/or image) associated with each modality (e.g., lidar and camera), and the average can be used as the estimated data output by the estimation component 108. Of course, any other method for combining the estimated maps is contemplated, including, but not limited to, use of Bayesian techniques.

Additional details associated with generating top-down representations of lidar data in an environment, that can be supplemented with image features, as described above, are described in U.S. patent application Ser. No. 16/586,620, filed on Sep. 11, 2019, the entire contents of which are incorporated by reference herein. Furthermore, while two different components and/or models (e.g., neural networks) are described for processing the camera data 106 and the lidar data 110, in an additional or alternative example, a single component and/or single model can be used to generate an estimated map. Moreover, while FIG. 1 makes reference to combining camera data 106 and lidar data 110, any type of sensor data can be provided as an input for generating the estimated map.

In at least one example, the estimation component 108 can analyze the output(s) of the estimation component 108 using another model that can detect and label aspects of the environment 104, such as driving lanes, lane lines, drivable surfaces (or, "on-road surfaces"), non-drivable surfaces (or, "off-road" surfaces), and the like. In some examples, a machine-trained model can output a mask associated with individual objects in the environment 104. The mask can be represented in plan view or from a top-down perspective (e.g., "top-down segmentation"). That is, the estimation component 108 can label the resulting top-down image using a "top-down segmentation" algorithm as described in U.S. patent application Ser. No. 15/963,833, filed on Apr. 26, 2018, the contents of which are incorporated by reference herein in its entirety.

In at least one example, the estimation component 108 can output an estimated map that is based at least in part on the lidar data 110 and the camera data 106. In at least one example, the estimated map can be a top-down representation of the environment 104 surrounding the vehicle 102. In such an example, the estimated map can be centered on the vehicle 102. Data encoded in the estimated map can be called "estimated map data" 112. Such data can encode information associated with the environment 104 in the estimated map, which can include, but is not limited to policy information pertaining to the rules of the road (e.g., driving lanes, lane lines, drivable surfaces/non-drivable surfaces, intersections, sidewalks, traffic flow indicators (e.g., traffic lights, speed limits, road signs, etc.), etc.). A non-limiting example of an estimated map and/or associated data is shown in FIG. 1. Such estimated map data 112 can be used for checking the consistency of stored map(s), as described below.

In at least one example, the one or more computing devices onboard the vehicle 102 can include a localization component. The localization component can determine a pose (position and orientation) of the vehicle 102 in relation to a local and/or global map based at least in part on sensor data received from the sensor component(s) and/or map data associated with a map. In at least one example, the determined vehicle pose 114 can be input into a map component 116. Furthermore, the local and/or global map can be provided as map input 118 into the map component 116. In at least one example, the local and/or global map can be a "stored map" that has been generated, at least in part, by previous data collection efforts. In at least one example, the stored map can be a top-down representation of the environment 104 and can be encoded with information associated with the environment 104, which can include, but is not limited to policy information pertaining to the rules of the road (e.g., driving lanes, lane lines, drivable surfaces/non-drivable surfaces, intersections, sidewalks, traffic flow indicators (e.g., traffic lights, speed limits, road signs, etc.), etc.).

In at least one example, the map component 116 can utilize the vehicle pose 114 and the map input 118 to access a portion of the environment 104 surrounding the vehicle 102. That is, the map component 116 can access the local and/or global map, and based at least in part on the vehicle pose 114, can access a portion of the local and/or global map that is surrounding the vehicle 102. Data encoded in such a top-down representation can be called "stored map data" 120. A non-limiting example of a stored map and/or associated data is shown in FIG. 1. Such stored map data 120 can be used for checking the consistency of the map input 118, or information derived therefrom, as described below.

In at least one example, the consistency checking component 122 can receive the estimated map data 112 and the stored map data 120 and the consistency checking component 122 can compare the estimated map data 112 and the stored map data 120 to determine whether the stored map data 120 is consistent with the estimated map data 112 and is therefore reliable. In at least one example, the consistency checking component 122 can utilize one or more consistency "checks" or evaluations to evaluate portions of the environment 104 (e.g., which can be associated with individual, corresponding pixels of the estimated map data 112 and the stored map data 120).

In at least one example, the consistency checking component 122 can output confidence scores associated with one or more checks. For example, based at least in part on comparing the estimated map data 112 with the stored map data 120, the consistency checking component 122 can output a confidence score indicating whether a trajectory associated with the vehicle 102 (e.g., along which the vehicle 102 is to drive) is on a drivable surface of the estimated map, a confidence score indicating that the trajectory will cross a lane line, a confidence score indicating that a pose of the vehicle 102 is reliable, and/or a confidence score indicating that information associated with the stored map is reliable. Additional details associated with each of the confidence scores are described below with reference to FIG. 5. In some examples, the confidence scores can be associated with indications of sources of inconsistencies. Such confidence scores and/or associated indications can comprise and/or can be used to determine "consistency output" 124.

In at least one example, the consistency output 124 can be provided to one or more down-stream components of the vehicle 102 for making decisions on how to traverse the environment 104. That is, the consistency output 124 can be monitored and the vehicle 102 (e.g., computing device(s) associated therewith) can use the consistency output 124 to determine how to control the vehicle 102. In at least one example, if the consistency output 124 indicates that the stored map data 120 is not consistent with the estimated map data 112, the computing device(s) associated with the vehicle 102 can cause the vehicle 102 to decelerate and/or stop. In some examples, the vehicle 102 can decelerate and travel at a velocity below a threshold until the inconsistency is resolved (e.g., confidence score(s) meet or exceed respective threshold(s)). Furthermore, in at least one example, if the consistency output 124 indicates that the stored map data 120 is not consistent with the estimated map data 112, the computing device(s) associated with the vehicle 102 can determine to use the estimated map instead of the stored map, at least until the inconsistency is resolved. In an additional or alternative example, the vehicle 102 can alter a planned trajectory to include regions of high consistency (e.g., confidence score(s) that meet or exceed respective threshold(s)) and avoid regions of low consistency (e.g., confidence score(s) below respective threshold(s)). That is, the confidence score(s) can be input into a planner component, described below, for use in determining and/or modifying a trajectory along which the vehicle 102 can travel.

Figure 2:
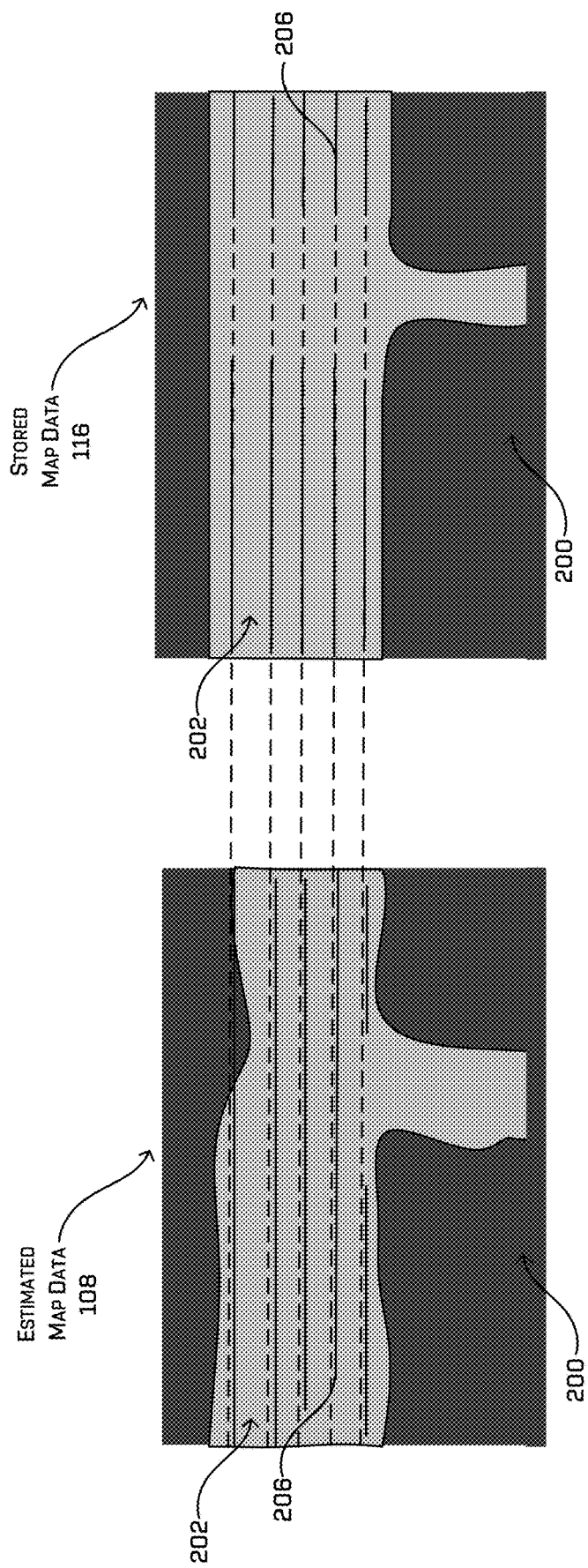
FIG. 2 illustrates an example of stored map data and estimated map data, as described herein.

FIG. 2 illustrates an example of the estimated map data 112 and the stored map data 120, as described herein. Both the estimated map data 112 and the stored map data 120 are top-down representations of the environment 104 surrounding a vehicle 102. As illustrated, both the estimated map data 112 and the stored map data 120 can include labels (e.g., masks) that indicate portions of the environment 104 that are associated with an "off-road" indicator 200, indicating that the corresponding portion of the environment 104 is associated with a surface that is not drivable, and an "on-road" indicator 202, indicating that the corresponding portion of the environment 104 is associated with a drivable surface. Furthermore, lane lines, marking driving lanes are also depicted. For example, lane line 206 is shown in both the estimated map data 112 and the stored map data 120. As illustrated, when compared, the estimated map data 112 and the stored map data 120 are inconsistent. That is, the lane lines in the estimated map data 112 are displaced from the dashed lines that represent the lane lines in the stored map data 120. This could result, for example, from the lane lines having been repainted at some time after the stored map was updated. In some examples, the displacement—or difference—can meet or exceed a threshold and in such an example, the consistency output 124 can indicate an inconsistency. As such, one or more down-stream components can make decisions on how to traverse the environment 104 based at least in part on the determined inconsistency.

FIG. 2 illustrates a single example of a check that can be performed by the consistency checking component 122. Additional or alternative examples of checks that can be performed by the consistency checking component 122 are described below with reference to FIG. 5.

Furthermore, while on-road indicators, off-road indicators, and lane lines are shown in FIG. 2, in additional or alternative examples, the maps can include additional or alternative map data, which can comprise map elements such lane markings, lane boundaries, one or more lane references (e.g., illustrating a centerline associated with a lane and/or a route between available (e.g., legal) lanes). Additional examples of map elements can include, but are not limited to, one or more of a lane element, a bike lane element, a crosswalk element, an intersection element, a lane divider element, a traffic light element, a stop sign element, a stop line element, a yield sign element, a yield line element, a parking lane element, a driveway element, a speed bump element, jay walking regions (e.g., a virtual crosswalk), trajectory waypoints (e.g., known trajectories), passenger pickup points, a sign location element, a geofence element, and the like. Furthermore, the estimated map data 112 and the stored map data 120 can include other information encoded in each of the maps, as described above. In at least one example, the map elements described above can comprise at least a portion of the "policy information" described above.

Figure 3:
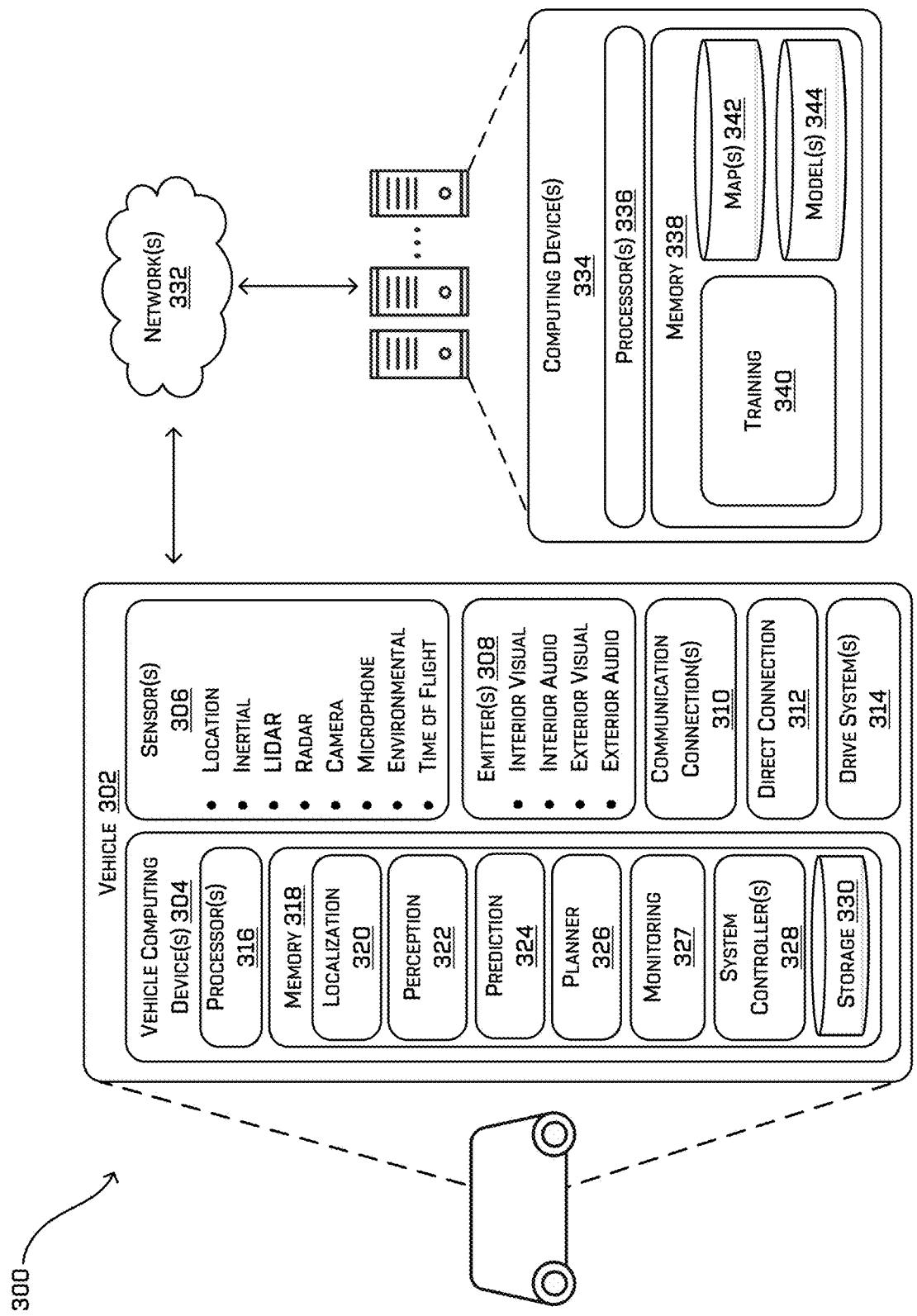
FIG. 3 is a block diagram illustrating an example system for performing techniques as described herein.

FIG. 3 is a block diagram illustrating an example system 300 for performing techniques as described herein.

In at least one example, a vehicle 302, which can correspond to the vehicle 102 described above with reference to FIG. 1, can include one or more vehicle computing devices 304, one or more sensor components 306, one or more emitters 308, one or more communication connections 310, at least one direct connection 312, and one or more drive systems 314. In at least one example, a vehicle 302 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 302 can be configured to control all functions from start to stop, including all parking functions, it can be unoccupied. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 302 is an autonomous vehicle; however, the vehicle 302 could be any other type of vehicle. While only a single vehicle 302 is illustrated in FIG. 3, in a practical application, the example system 300 can include a plurality of vehicles, which, in some examples, can comprise a fleet of vehicles.

The vehicle computing device(s) 304 can include processor(s) 316 and memory 318 communicatively coupled with the processor(s) 316. In the illustrated example, the memory 318 of the vehicle computing device(s) 304 stores a localization component 320, a perception component 322, a prediction component 324, a planner component 326, a monitoring component 327, and one or more system controllers 328. Additionally, the memory 318 can include a storage 330, which can store map(s), model(s), previous outputs, etc. A map can be any number of data structures that are capable of providing information about an environment, such as, but not limited to, topologies (such as junctions, lanes, merging zones, etc.), streets, mountain ranges, roads, terrain, and the environment in general. Maps can be associated with real environments or simulated environments. The stored maps referred to herein can correspond to at least some of the maps stored in the storage 330. Model(s) can include machine-trained models, as described below. In some examples, the storage 330 can store previous outputs.

In at least one example and as described above, the localization component 320 can determine a pose (position and orientation) of the vehicle 302 in relation to a local and/or global map based at least in part on sensor data received from the sensor component(s) 306 and/or map data associated with a map (e.g., of the map(s)). In at least one example, the localization component 320 can include, or be associated with, a calibration component that is capable of performing operations for calibrating (determining various intrinsic and extrinsic parameters associated with any one or more of the sensor component(s) 306), localizing, and mapping substantially simultaneously.

In at least one example, the perception component 322 can perform object detection, segmentation, and/or classification based at least in part on sensor data received from the sensor component(s) 306. In at least one example, the perception component 322 can receive raw sensor data (e.g., from the sensor component(s) 306). In at least one example, the perception component 322 can receive sensor data and can utilize one or more processing algorithms to perform object detection, segmentation, and/or classification with respect to object(s) identified in the sensor data. In some examples, the perception component 322 can associate a bounding region (or otherwise an instance segmentation) with an identified object and can associate a confidence score associated with a classification of the identified object with the identified object. In some examples, objects, when rendered via a display, can be colored based on their perceived class.

The prediction component 324 can receive sensor data from the sensor component(s) 306, map data associated with a map (e.g., of the map(s) which can be in storage 330), and/or perception data output from the perception component 322 (e.g., processed sensor data), and can output predictions associated with one or more objects within the environment of the vehicle 302. In at least one example, the planner component 326 can determine outputs, to use to control the vehicle 302 based at least in part on sensor data received from the sensor component(s) 306, map data, and/or any determinations made by the other components of the vehicle 302.

Additional details of localization components, perception components, prediction components, and/or planner components that are usable can be found in U.S. Pat. No. 9,612,123, issued on Apr. 4, 2017, and U.S. Pat. No. 10,353,390, issued on Jul. 16, 2019, the entire contents of both of which are incorporated by reference herein. In some examples (e.g., where the vehicle 302 is not an autonomous vehicle), one or more of the aforementioned components can be omitted from the vehicle 302.

The monitoring component 327 can receive sensor data from sensor component(s) 306 and can compare estimated map(s) with stored map(s) to monitor the accuracy of the stored map(s), as described above with reference to FIG. 1. In at least one example, the monitoring component 327 can include the estimation component 108, the map component 116, and the consistency checking component 122, described above with reference to FIG. 1. As described above, in at least one example, the monitoring component 327 can be independent from other components onboard vehicle 302 that estimate pose (e.g., the localization component 320). Consistency output, as described above, can be monitored by the monitoring component 327 and the monitoring component 327 can provide an input to the planner component 326. That is, techniques described herein relate to independently-performed, redundant techniques for monitoring consistency between stored maps and estimated maps to ensure that other components onboard the vehicle 302 (e.g., the planner component 326, etc.) can safely rely on the stored maps and/or information derived therefrom to make decisions.

While the components described above are illustrated as "onboard" the vehicle 302, in other implementations, the components can be remotely located and/or accessible to the vehicle 302. Furthermore, while the components are described above as "components," such components can comprise one or more components, which can be part of a system, for performing operations attributed to each of the components.

In at least one example, the localization component 320, the perception component 322, the prediction component 324, the planner component 326, and/or the monitoring component 327 can process sensor data, as described above, and can send their respective outputs over network(s) 332, to computing device(s) 334. In at least one example, the localization component 320, the perception component 322, the prediction component 324, the planner component 326, and/or the monitoring component 327 can send their respective outputs to the computing device(s) 334 at a particular frequency, after a lapse of a predetermined period of time, in near real-time, etc.

In at least one example, the vehicle computing device(s) 304 can include one or more system controllers 328, which can be configured to control steering, propulsion, braking, safety, emitters, communication, and other systems of the vehicle 302. These system controller(s) 328 can communicate with and/or control corresponding systems of the drive system(s) 314 and/or other systems of the vehicle 302.

In at least one example, the sensor component(s) 306 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor component(s) 306 can provide input to the vehicle computing device(s) 304. In some examples, the sensor component(s) 306 can preprocess at least some of the sensor data prior to sending the sensor data to the vehicle computing device(s) 304. In at least one example, the sensor component(s) 306 can send sensor data, via the network(s) 332, to the computing device(s) 334 at a particular frequency, after a lapse of a predetermined period of time, in near real-time, etc.

The vehicle 302 can also include one or more emitters 308 for emitting light and/or sound, as described above. The emitter(s) 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 308 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 308 can be positioned at various locations about the exterior and/or interior of the vehicle 302.

The vehicle 302 can also include communication connection(s) 310 that enable communication between the vehicle 302 and other local or remote computing device(s). For instance, the communication connection(s) 310 can facilitate communication with other local computing device(s) on the vehicle 302 and/or the drive system(s) 314. Also, the communication connection(s) 310 can allow the vehicle to communicate with other nearby computing device(s) (e.g., other nearby vehicles, traffic signals, etc.). The communications connection(s) 310 also enable the vehicle 302 to communicate with a remote teleoperations computing device or other remote services.

The communications connection(s) 310 can include physical and/or logical interfaces for connecting the vehicle computing device(s) 304 to another computing device or a network, such as network(s) 332. For example, the communications connection(s) 310 can enable Wi-Fi-based communication such as via frequencies defined by the IEEE 802.11 standards, short range wireless frequencies such as BLUETOOTH or any suitable wired or wireless communications protocol that enables the respective computing device to interface with the other computing device(s).

The direct connection 312 can directly connect the drive system(s) 314 and other systems of the vehicle 302.

In at least one example, the vehicle 302 can include drive system(s) 314. In some examples, the vehicle 302 can have a single drive system 314. In at least one example, if the vehicle 302 has multiple drive systems 314, individual drive systems 314 can be positioned on opposite ends of the vehicle 302 (e.g., the front and the rear, etc.). In at least one example, the drive system(s) 314 can include sensor component(s) to detect conditions of the drive system(s) 314 and/or the surroundings of the vehicle 302. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 314. In some cases, the sensor component(s) on the drive system(s) 314 can overlap or supplement corresponding systems of the vehicle 302 (e.g., sensor component(s) 306).

The drive system(s) 314 can include many of the vehicle systems, including a high voltage battery, a motor to propel the vehicle 302, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 314 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 314. Furthermore, the drive system(s) 314 also include communication connection(s) that enable communication by the respective drive system with other local or remote computing device(s).

In FIG. 3, the vehicle computing device(s) 304, sensor component(s) 306, emitter(s) 308, and the communication connection(s) 310 are shown onboard the vehicle 302. However, in some examples, the vehicle computing device(s) 304, sensor component(s) 306, emitter(s) 308, and the communication connection(s) 310 can be implemented outside of an actual vehicle (i.e., not onboard the vehicle 302).

As described above, the vehicle 302 can send sensor data to the computing device(s) 334, via the network(s) 332. In some examples, the vehicle 302 can send raw sensor data to the computing device(s) 334. In other examples, the vehicle 302 can send processed sensor data and/or representations of sensor data to the computing device(s) 334 (e.g., data output from the localization component 320, the perception component 322, the prediction component 324, the planner component 326, and/or the monitoring component 327). In some examples, the vehicle 302 can send sensor data to the computing device(s) 334 at a particular frequency, after a lapse of a predetermined period of time, in near real-time, etc.

The computing device(s) 334 can receive the sensor data (raw or processed) from the vehicle 302 and/or other data collection devices, as well as data from one or more third party sources and/or systems. In at least one example, the computing device(s) 334 can include processor(s) 336 and memory 338 communicatively coupled with the processor(s) 336. In the illustrated example, the memory 338 of the computing device(s) 334 stores a training component 340, a map(s) storage 342 (e.g., storing one or more maps), and a model(s) storage 344 (e.g., models output by the training component 340). In some examples, one or more of the systems and/or storage repositories can be associated with the vehicle 302 or other computing device(s) associated with the system 300 instead of, or in addition to, being associated with the memory 338 of the computing device(s) 334.

In at least one example, the training component 340 can train model(s) based at least in part on training data, which can be used for various operations as described herein. For example, the training component 340 can train model(s) used by the estimation component 108, the map component 116, the consistency checking component 122, the localization component 320, the perception component 322, the prediction component 324, the planner component 326, and the like. In at least one example, the resulting model(s) can be stored in the model(s) storage 344 and/or the storage 330 on the vehicle 302 and can be accessed in near real-time by one or more components of the vehicle computing device(s) 304.

In at least some examples, the training component 340 may train a model for each sensor modality individually. In several examples, a single model may be trained having multiple output heads associated with one or more modalities. In any case, a known portion of a policy map (top-down encoding of policies, such as lane markings, drivable surfaces, street directions, etc., as described herein) associated with corresponding sensor data may be utilized as a "ground truth." In such examples, sensor data from one or more of the sensor modalities (lidar, camera, radar, etc.) may be introduced to the model and compared against the corresponding policy map for determining losses for backpropagation. In at least some examples, such losses may be weighted based on the differing channels used as inputs to the various models.

In at least one example, the training component 340 can train model(s) using machine learning techniques. Machine learning algorithms that can be used to for training the model(s) can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), other Deep Belief Networks (DBN), Artificial Neural Network (ANN), Residual Neural Network (Resnet), fully connected neural netwoks, Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), SVM (support vector machine), supervised learning, unsupervised learning, semi-supervised learning, etc.

In at least one example, the training component 340 can train a model for determining inconsistencies between stored map(s) and estimated map(s). That is, the training component 340 can train the model(s) used by the consistency checking component 122, as described above with reference to FIG. 1. In at least one example, the training component 340 can use perception data (e.g., data determined by the perception component 322) as ground truth. In at least one example, the perception data can be converted into a top-down representation of an environment surrounding vehicle using techniques described above. The training component 340 can train the model(s) based on the perception data and input data, which can include lidar features (e.g., top down lidar occupancy, normalized lidar density, maximum_z (max_z), maximum_z divided into portions (max_z over n portions), etc.) and vision features (e.g., configurable set of input cameras, configurable downsample resolution, etc.) that are temporarily aggregated at a frequency (e.g., 10 hertz) for a configurable number of frames. In at least one example, sample inputs can be provided to the training component 340 to verify a sensitivity of the model. Such sample inputs can include variations of vehicle pose (e.g., x, y, and yaw) or map data that indicates changes to environments (e.g., events for lane repainting, side walk changes, stop sign labelling (wrong), etc.). In at least one example, the model can analyze the sample inputs and generate outputs.

The processor(s) 316 of the vehicle 302 and the processor(s) 336 of the computing device(s) 334 can be any suitable processor capable of executing instructions to process data and perform operations as described herein. By way of example and not limitation, the processor(s) 316 and 336 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318 and 338 are examples of non-transitory computer-readable media. Memory 318 and 338 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in some examples, components of the vehicle 302 can be associated with the computing device(s) 334 and/or the components of the computing device(s) 334 can be associated with the vehicle 302. That is, the vehicle 302 can perform one or more of the functions associated with the computing device(s) 334, and vice versa.

Furthermore, while the vehicle computing device(s) 304 and the computing device(s) 334 are shown to include multiple components, in some examples, such components can be associated with more or fewer individual components. For example, in an example, a localization component, a perception component, a prediction component, and/or a planner component can be combined into a single component. Or, an annotation component, a training component, a training data generation component, and/or a training component can be combined into a single component. That is, while depicted as separate components, any one or more of the components can be combined.

Figure 4:
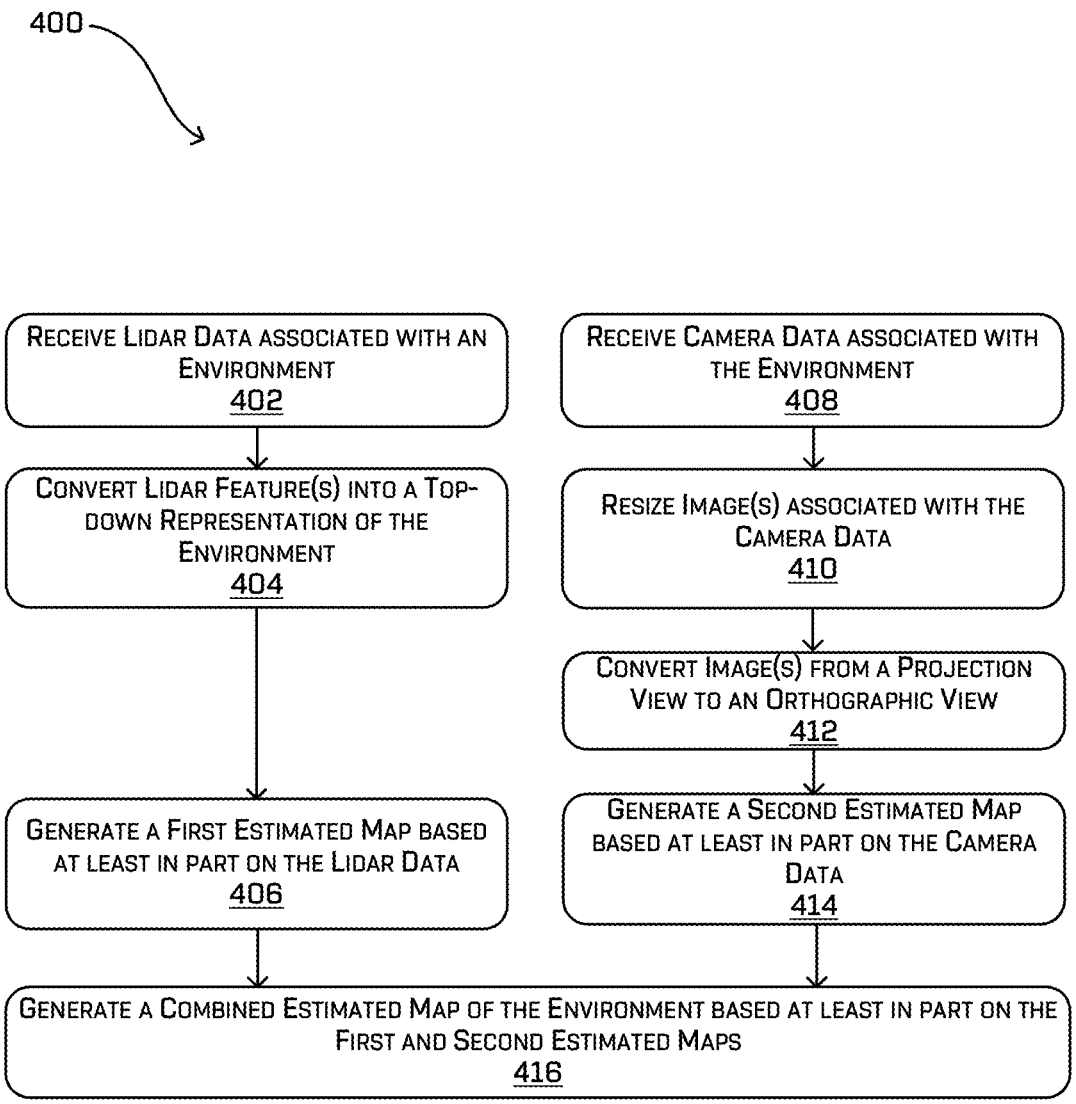
FIG. 4 illustrates an example process for generating an estimated map based on sensor data, as described herein.
Figure 5:
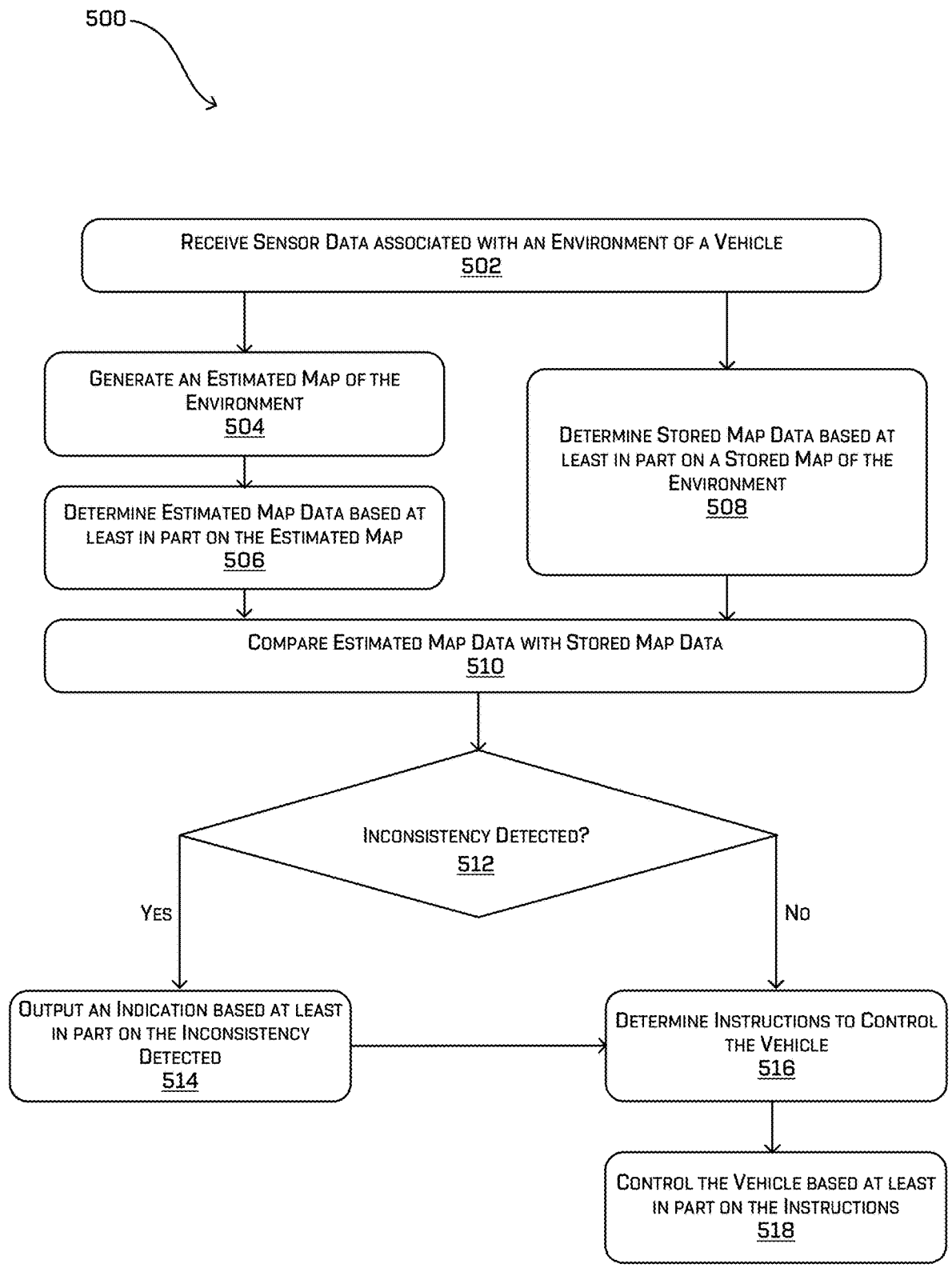
FIG. 5 illustrates an example process for determining whether a stored map is consistent with an estimated map, as described herein.

FIGS. 4 and 5 are flowcharts showing example processes involving techniques as described herein. The processes illustrated in FIGS. 4 and 5 are described with reference to components described above with reference to FIG. 1 and the system 300 shown in FIG. 3 for convenience and ease of understanding. However, the processes illustrated in FIGS. 4 and 5 are not limited to being performed using the components described above with reference to FIG. 1 and/or the system 300. Moreover, the components described above with reference to FIG. 1 and/or the system 300 described herein is not limited to performing the processes illustrated in FIGS. 4 and 5.

The processes 400 and 500 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes 400 and 500 can be combined in whole or in part with each other or with other processes.

FIG. 4 illustrates an example process 400 for generating an estimated map based on sensor data, as described herein.

At operation 402, the estimation component 108 can receive lidar data associated with an environment. In at least one example, the vehicle 302 can be associated with one or more sensor components 306. In at least one example, the sensor component(s) 306 can capture data associated with an environment surrounding the vehicle 302. In at least one example, the sensor component(s) 306 can include lidar sensors. In at least one example, lidar sensors onboard the vehicle 302 can provide lidar data to the estimation component 108, which can be associated with the monitoring component 327. In at least one example, the lidar data can be associated with point clouds in a grid, as described above. In at least one example, the lidar data can be associated with one or more features, which can include grid occupancy, grid density, maximum_z (max_z), maximum_z divided into two or more bins (max_z divided into bins), minimum_z (min_z), intensity at minimum_z (min_z), etc.

At operation 404, the estimation component 108 can convert lidar feature(s) into a top-down representation of the environment. In at least one example, the lidar processing component associated with the estimation component 108 can generate a top-down representation of an environment based at least in part on the lidar data. For instance, the lidar processing component can accumulate features of objects in the environment over a projected voxel area. The lidar processing component may combine the accumulated features into voxel features, which represent the features in the three-dimensional space of the projected voxel area. In some examples, the lidar processing component may collapse the voxel features along the height dimension to generate orthographic features. The orthographic features, therefore, represent dimensions and/or characteristics of an object in a two-dimensional plane from the three-dimensional voxel features. The lidar processing component may output the orthographic features of the object as part of a top-down representation of the environment. In at least one example, the resulting top-down representation can be a first estimated map. That is, the lidar processing component can generate a first estimated map based at least in part on the lidar data, as illustrated at operation 406.

At operation 408, the estimation component 108 can receive camera data associated with the environment. In at least one example, the sensor component(s) 306 can include cameras. In at least one example, cameras onboard the vehicle 302 can provide camera data (e.g., image(s) captured by camera(s)) to the estimation component 108. In at least one example, the camera data can include images from various cameras that are disposed about the vehicle 302 to capture various angles of the environment within which the vehicle 302 is positioned. For example, in at least one example, the camera data can include images from eight different cameras which can capture eight different portions of the environment.

At operation 410, the estimation component 108 can resize the image(s) associated with the camera data. As described above, in at least one example, the estimation component 108 can include one or more components for processing the camera data. In an example, an image processing component associated with the estimation component 108 can receive the camera data and can resize each of the images to a designated size, which in some examples can correspond to a same or similar size of the lidar input (e.g., 320×192×3).

At operation 412, the estimation component 108 can convert image(s) from a projection view to an orthographic view. In at least one example, the image processing component associated with the estimation component 108 can process the resized images using one or more models. For example, the image processing component can encode the resized images (e.g., using a neural network, such as a residual neural network) to generate image feature representations, as described above. Then, in at least one example, the image processing component can use a fully connected neural network to convert images from a projection view to an orthogonal view. In at least one example, the image processing component can decode the resized images (e.g., using a neural network, such as a residual neural network). In at least one example, the resulting image feature representation can be a second estimated map. That is, the image processing component can generate a second estimated map based at least in part on the camera data, as illustrated at operation 414.

As described above, in examples, the second estimated map can include indications of pedestrian(s) (which may also include information related to the type of object, and/or movement information associated with the pedestrian(s) embedded in the second estimated map at the location of the indication), vehicle(s) (which may also include information related to the respective vehicle(s) such as the type of object, and/or movement information associated with the respective vehicle(s) embedded in the second estimated map at the locations of the indications), and the like. Similarly, the second estimated map can be embedded with information regarding speed limits, lane lines, lane widths, lane ends, stop lines, traffic lights, traffic light states, and the like.

At operation 414, the estimation component 108 can generate a combined estimated map of the environment based at least in part on the first and second estimated maps. Although the first estimated map and the second estimated map are capable of including information of similar types and values, in some cases, the information embedded in the two different maps can be different. In at least one example, the estimation component 108 can combine the first and second estimated maps. In some examples, the combined output can include information from both of the estimated maps regarding object type, bounding boxes, movement information, and the like. In at least one example, an average can be computed based at least in part on the output (e.g., representation and/or image) associated with each modality (e.g., lidar and camera), and the average can be used as the estimated data output by the estimation component 108. Of course, any other method for combining the estimated maps is contemplated, including, but not limited to, use of Bayesian techniques.

While two different components and/or models (e.g., neural networks) are described for processing the camera data and the lidar data, in an additional or alternative example, a single component and/or single model can be used to generate an estimated map. Moreover, while FIG. 1 makes reference to combining camera data and lidar data, any type of sensor data can be provided as an input for generating the estimated map. That is, the estimated map can be generated from the same or different sensor modalities.

FIG. 5 illustrates an example process 500 for determining whether a stored map is consistent with an estimated map, as described herein.

At operation 502, the vehicle computing device(s) 304 can receive sensor data from the sensor component(s) 306 associated with the vehicle 302. As described above, in at least one example, the sensor component(s) 306 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor component(s) 306 can provide input to the vehicle computing device(s) 304. In some examples, the sensor component(s) 306 can preprocess at least some of the sensor data prior to sending the sensor data to the vehicle computing device(s) 304. As described above, the sensor data can be associated with an environment surrounding the vehicle 302.

At operation 504, the estimation component 108 can generate an estimated map of the environment. As described above with reference to FIG. 4, the estimation component 108 can generate an estimated map of the environment based at least in part on lidar data and camera data.

At operation 506, the estimation component 108 can determine estimated map data based at least in part on the estimated map. As described above, in at least one example, the estimated map can be a top-down representation of the environment surrounding the vehicle 302. In such an example, the estimated map can be centered on the vehicle 302. Data encoded in the estimated map can be called "estimated map data." Such data can encode information associated with the environment in the estimated map, which can include, but is not limited to policy information pertaining to the rules of the road (e.g., driving lanes, lane lines, drivable surfaces/non-drivable surfaces, intersections, sidewalks, traffic flow indicators (e.g., traffic lights, speed limits, road signs, etc.), etc.). Such estimated map data can be used for checking the consistency of stored map(s), as described below. Additional examples of estimated map data are described below with reference to operation 510.

At operation 508, the map component 116 can determine stored map data based at least in part on a stored map of the environment. As described above, in at least one example, the localization component 320 can determine a pose (position and orientation) of the vehicle 302 in relation to a local and/or global map based at least in part on sensor data received from the sensor component(s) 306 and/or map data associated with a map (e.g., of the map(s)). In at least one example, the determined vehicle pose can be input into a map component 116, which can be associated with the monitoring component 327. Furthermore, the local and/or global map can be provided as map input into the map component 116. In at least one example, the local and/or global map can be a "stored map" that has been generated, at least in part, by previous data collection efforts. In at least one example, the map component 116 can utilize the vehicle pose and the map input to access a portion of the local and/or global map that surrounds the vehicle 302. Data encoded in the stored map can be called "stored map data," as described above. Such data can encode information associated with the environment in the estimated map, which can include, but is not limited to policy information pertaining to the rules of the road (e.g., driving lanes, lane lines, drivable surfaces/non-drivable surfaces, intersections, sidewalks, traffic flow indicators (e.g., traffic lights, speed limits, road signs, etc.), etc.). Such stored map data can be used for checking the consistency of stored map(s), as described below. Data encoded in such a top-down representation can be called "stored map data." Examples of stored map data are described below with reference to operation 510.

At operation 510, the consistency checking component 122 can compare estimated map data with stored map data. In at least one example, the consistency checking component 122, which can be associated with the monitoring component 327, can receive the estimated map data and the stored map data and the consistency checking component 122 can compare the estimated map data and the stored map data to determine whether the stored map data is consistent with the estimated map data and is therefore reliable.

As described above, in at least one example, the consistency checking component 122 can output confidence scores associated with one or more checks. For example, based at least in part on comparing the estimated map data with the stored map data, the consistency checking component 122 can output a confidence score indicating whether a trajectory associated with the vehicle 302 (e.g., along which the vehicle 302 is to drive) is on a drivable surface of the estimated map, a confidence score indicating that the trajectory will cross a lane line, a confidence score indicating that a pose of the vehicle 302 is reliable, and/or a confidence score indicating that information associated with the stored map is reliable. In some examples, the confidence scores can be associated with indications of sources of inconsistencies. Such confidence scores and/or associated indications can comprise "consistency output," as described above. In some examples, the consistency checking component 122 can output a confidence score based on a combination of the consistency checks.

As described above, in at least one example, the planner component 326 can determine outputs, to use to control the vehicle 302 based at least in part on sensor data received from the sensor component(s) 306, map data, and/or any determinations made by the other components of the vehicle 302. In at least one example, such outputs can be associated with a trajectory along which the vehicle 302 is to move within the environment. In at least one example, the planner component 326 can generate the outputs and/or the trajectory based at least in part on perception data (e.g., output from the perception component 322), prediction data (e.g., output from the prediction component 324), map data (e.g., based at least in part on the map(s) in the storage 330), etc.

In at least one example, the consistency checking component 122 can compare a trajectory generated by the planner component 326 (e.g., based at least in part on the stored map data) with the estimated map data to determine whether the trajectory is associated with an on-road (e.g., drivable) label. For example, the consistency checking component 122 can compare individual output pixels (e.g., of the estimated map) that correspond to the trajectory to determine whether the individual output pixels are associated with an "on-road" (e.g., drivable) or "off-road" (e.g., not drivable) indication. In at least one example, if individual output pixels that correspond to the trajectory are associated with an "off-road" (e.g., not drivable) indication, the consistency checking component can determine an inconsistency between the stored map data and the estimated map data, as illustrated at operation 512. In some examples, the consistency checking component 122 can determine an inconsistency based at least in part on a number of pixels that are associated with an "off-road" (e.g., not drivable) indication being greater than or equal to a threshold.

In some examples, the consistency checking component 122 can output a confidence score, or other indicator, indicating whether the trajectory is on a drivable surface, which can be determined based at least in part on the number of pixels associated with an "off-road" indication. In at least one example, if the confidence score meets or exceeds a threshold, the monitoring component 327 can determine an inconsistency between the stored map data and the estimated map data, as illustrated at operation 512.

In at least one example, the consistency checking component 122 can compare a trajectory generated by the planner component 326 (e.g., based at least in part on the stored map data) with the estimated map data to determine whether the vehicle 302 is likely to cross lane lines unintentionally. For example, the consistency checking component 122 can compare individual output pixels (e.g., of the estimated map) that correspond to the trajectory to determine whether the individual output pixels are associated with a lane line or whether two or more pixels are associated with different driving lanes. In some examples, the consistency checking component 122 can determine whether the vehicle 302 is associated with a lane change intent. In at least one example, if (i) individual output pixels are associated with a lane line or two or more pixels are associated with different driving lanes and (ii) the vehicle 302 is not associated with a lane change intent, the consistency checking component 122 can determine an inconsistency between the stored map data and the estimated map data, as illustrated at operation 512.

In at least one example, the consistency checking component 122 can determine the intent of the vehicle 302 based at least in part on comparing the trajectory to the stored map data to determine whether individual output pixels are associated with a lane line or whether two or more pixels are associated with different driving lanes. If individual output pixels are associated with a lane line or two or more pixels are associated with different driving lanes in the stored map data, the consistency checker can determine that the vehicle 302 is associated with a lane change intent. In some examples, the consistency checking component 122 can determine an inconsistency based at least in part on a number of pixels that are associated with the trajectory and two or more driving lanes and/or crossing a lane line being greater than or equal to a threshold.

In some examples, the consistency checking component 122 can output a confidence score indicating whether the trajectory will cross a lane line. In at least one example, the confidence score can be based at least in part on whether the individual output pixels are associated with a lane line or whether two or more pixels are associated with different driving lanes. In at least one example, if the confidence score meets or exceeds a threshold, the monitoring component 327 can determine an inconsistency between the stored map data and the estimated map data, as illustrated at operation 512. In some examples, the consistency checking component 122 can determine whether the vehicle 302 is associated with a lane change intent. In such an example, if the vehicle 302 is associated with a lane change intent and the trajectory crosses lane lines, the monitoring component 327 can disregard or override the determined inconsistency.

In at least one example, the consistency checking component 122 can compare pose information associated with the vehicle 302. For instance, in at least one example, the estimated map can represent a region of an environment centered on the vehicle 302 and the stored map can represent a region of the environment centered on the vehicle 302 based on pose information of the vehicle 302. The consistency checking component 122 can compare the estimated map and the stored map to determine whether the stored map is consistent with the estimated map, and thus whether the pose information associated with the vehicle 302 (e.g., as output by the localization component 320) is reliable. In at least one example, the consistency checking component 122 can use a Kanade-Lucas-Tomasi (KLT) feature tracking algorithm to determine a displacement between the stored map data and the estimated map data. For example, the consistency checking component 122 can estimate pose displacement by assuming that there is Δx displacement from the first pose estimation $I_{est}(x)$ to input $I(x)$, namely, $$I_{est}(x)=I(x+\Delta x).$$

As such, the solution to said problem can be modeled as follows:

$$\Delta x = \left( \sum \frac{\partial I}{\partial x}(x) \frac{\partial I}{\partial x}(x)^T \right)^{-1} \left[ \sum (I_{est}(x) - I(x)) \frac{\partial I}{\partial x}(x) \right].$$

In at least one example, consistency checking component 122 can compare the displacement (e.g., Δx) with a threshold to determine whether the displacement meets or exceeds the threshold. In at least one example, if the displacement meets or exceeds a threshold, the consistency checking component 122 can determine an inconsistency between the stored map data and the estimated map data, as illustrated at operation 512. While a displacement with respect to "x" is described, displacement can be determined for any extent of the pose (e.g., x, y, yaw, etc.). Furthermore, in some examples, another difference can be determined for checking consistency of pose information. In some examples where the displacement meets or exceeds a second threshold (which may, in some examples, be the same as the threshold above), the map consistency check may not be implemented, as it may be indicative of an error in localization and may not correspond to an error in mapping.

In some examples, the consistency checking component 122 can determine a confidence score indicating that a pose of the vehicle 302 is reliable, based at least in part on the displacement. For instance, in at least one example, the larger the displacement, the lower the confidence score may be, and vice versa. In at least one example, if the confidence score meets or exceeds a threshold, the monitoring component 327 can determine an inconsistency between the stored map data and the estimated map data, as illustrated at operation 512.

In at least one example, the consistency checking component 122 can compare map elements associated with the estimated map data and the stored map data—for instance, as determined based on the stored map data and as determined based on the estimated map data—to output an indication whether information output based on the stored map data is reliable. Examples of map elements are described above. In at least one example, the consistency checking component 122 can compare a first map element (e.g., a lane line) in the estimated map data with a second map element (e.g., a lane line), that corresponds to a same feature, in the stored map data. The consistency checking component 122 can determine a difference or other displacement between the first map element and the second map element, and if the difference or other displacement meets or exceeds a threshold, the consistency checking component 122 can determine an inconsistency between the stored map data and the estimated map data, as illustrated at operation 512. In at least one example, the difference and/or other displacement can be determined based at least in part on any extent of the map element (e.g., x, y, yaw).

As an example, for determining lane line consistency, the consistency checking component 122 can subtract dilated input associated with lane lines as indicated in the stored map data with input associated with lane lines as indicated in the estimated map data to generate line segments that can be perceived in the real world but are not present in the stored map data. In some examples, pixels associated with residual lines can be weighted by inverse their distance to the vehicle 302 (e.g., because estimation may be better near the vehicle 302 than farther away from the vehicle 302). In at least one example, if a connected component is associated with a weight that meets or exceeds a threshold, the consistency checking component 122 can determine an inconsistency between the stored map data and the estimated map data, as illustrated at operation 512.

In some examples, the consistency checking component 122 can determine a confidence score indicating that information associated with the stored map is reliable. In some examples, the confidence score can be based at least in part on the difference and/or other displacement. For instance, in at least one example, the larger the difference and/or other displacement, the lower the confidence score may be, and vice versa. In some examples, the confidence score can be based at least in part on a weight associated with a map element. In at least one example, if the confidence score meets or exceeds a threshold, the monitoring component 327 can determine an inconsistency between the stored map data and the estimated map data, as illustrated at operation 512.

In some examples, consistency outputs and/or confidence scores can be aggregated over the local and/or global map, or a portion thereof, which can indicate which portions of the environment (e.g., pixel-wise) are associated with consistent or inconsistent results and/or confidence scores. Such information can be used by the planner component 326, for example to select trajectories that are associated with more consistent regions.

At operation 514, based at least in part on detecting an inconsistency (e.g., "yes" from operation 512), the monitoring component 327 can output an indication that an inconsistency has been detected. In some examples, the output (e.g., "consistency output" 124, in FIG. 1) can indicate that an inconsistency was detected and/or information associated with the inconsistency detected (e.g., where the inconsistency was detected). In at least one example, such output can be used by one or more down-stream components of the vehicle 302 for making decisions on how to traverse the environment.

At operation 516, the planner component 326 can determine instructions to use to control the vehicle 302. In some examples, the instructions can be determined based at least in part on sensor data received from the sensor component(s) 306, map data, and/or any determinations made by the other components of the vehicle 302, such as the monitoring component 327. In at least one example, such instructions can be associated with a trajectory along which the vehicle 302 is to move within the environment. If an inconsistency is determined, the planner component 326 can determine instructions based on the determined inconsistency.

At operation 518, the system controller(s) 328 can control the vehicle 302 based at least in part on the instructions. In at least one example, the vehicle computing device(s) 304 can include one or more system controllers 328, which can be configured to control steering, propulsion, braking, safety, emitters, communication, and other systems of the vehicle 302. These system controller(s) 328 can communicate with and/or control corresponding systems of the drive system(s) 314 and/or other systems of the vehicle 302 such that the corresponding systems of the drive system(s) 314 and/or other systems of the vehicle 302 can execute the instructions and the vehicle 302 can follow the trajectory.

In at least one example, if an inconsistency is detected (e.g., "yes" from operation 512), the planner component 326 and/or system controller(s) 328 can cause the vehicle 302 to decelerate and/or stop. In some examples, the planner component 326 and/or system controller(s) 328 can cause the vehicle 302 to decelerate and travel at a velocity below a threshold until the inconsistency is resolved (e.g., confidence score(s) meet or exceed respective threshold(s)).

Furthermore, in at least one example, if the consistency output indicates that the stored map data is not consistent with the estimated map data, the component(s) onboard the vehicle 302 (e.g., the localization component 320, the perception component 322, the prediction component 324, the planner component 326, etc.) can determine to use the estimated map instead of the stored map until the inconsistency is resolved (e.g., confidence score(s) meet or exceed respective threshold(s)). In an additional or alternative example, the planner component 326 can alter a planned trajectory to include regions of high consistency and avoid regions of low consistency (e.g., confidence score(s) below respective threshold(s)). In some examples, consistency outputs and/or confidence scores can be aggregated over the local and/or global map, or a portion thereof, which can indicate which portions of the environment (e.g., pixel-wise) are associated with consistent or inconsistent results and/or confidence scores. Such information can be used by the planner component 326, for example to select trajectories that are associated with more consistent regions. That is, the confidence score(s) can be input into a planner component 326.

In some examples, a consistency output indicating an inconsistency, can trigger remapping, additional data collection, or the like by other vehicles in a fleet of vehicles. Further, in some examples, a consistency output indicating an inconsistency can cause the vehicle 302 to move closer to inconsistent portions of the stored map to obtain a new reading (e.g., in an effort to determine if the output is the same or different).

As described above with reference to FIGS. 1-5, techniques described herein can be useful for monitoring stored maps to ensure such stored maps and/or information derived therefrom is reliable. That is, environments can change, and in some examples, stored maps may not be updated to reflect such changes. If a stored map is not accurate, an autonomous vehicle relying on such a stored map can make decisions that may not be safe. As an example, if a stored map shows that a portion of an environment is a drivable surface (e.g., associated with an "on-road" indication) when the portion of the environment is not a drivable surface, the autonomous vehicle can end up driving on a surface that isn't actually drivable. As another example, if a stored map shows a driving lane in a particular position and the driving lane has been repainted or otherwise is in a different position, the autonomous vehicle can end up driving in multiple lanes unintentionally.

As such, it is imperative that stored maps are reliable so that autonomous vehicles can make decisions while traversing an environment to ensure safety for passengers and surrounding persons and objects. Techniques described above with reference to FIGS. 1-5 avail methods, apparatuses, and systems to enable determining whether a stored map of an environment is reliable, by comparing the stored map to an estimated map generated based at least in part on sensor data received in near real-time from sensor component(s) onboard a vehicle, such as an autonomous vehicle. As described above, techniques described herein can be performed by a monitoring component 327 that is independent from other components onboard the vehicle 302 that estimate pose (e.g., the localization component 320). Such techniques can utilize different sensor modalities (e.g., camera and lidar) to offer redundancy in making monitoring decisions. As such, techniques described herein relate to independently-performed, redundant techniques for monitoring consistency between stored maps and estimated maps to ensure that other components onboard the vehicle 302

(e.g., the planner component 326, etc.) can safely rely on the stored maps and/or information derived therefrom to make decisions.

Example Clauses

A. A method comprising: receiving lidar data and camera data associated with an environment in which an autonomous vehicle is positioned; generating, based at least in part on the lidar data and the camera data, an estimated map of the environment, wherein the estimated map is encoded with policy information for driving within the environment; comparing first information associated with a stored map of the environment with second information associated with the estimated map; determining, based at least in part on the comparing, an inconsistency between the estimated map and the stored map; and controlling the autonomous vehicle based at least in part on the inconsistency.

B. The method as paragraph A recites, wherein generating the estimated map comprises: generating, based at least in part on the lidar data, a first top-down representation of the environment; generating, based at least in part on the camera data, a second top-down representation of the environment; and combining the first top-down representation and the second top-down representation, wherein the estimated map comprises an average of the first top-down representation and the second top-down representation.

C. The method as paragraph A or B recites, wherein: the first information is a first road marking in the stored map; the second information is a second road marking, corresponding to the first road marking, on the estimated map; and determining the inconsistency comprises: determining a difference between the first road marking and the second road marking; and determining that the difference meets or exceeds a threshold.

D. The method as any of paragraphs A-C recites, wherein: the first information is a trajectory, determined based at least in part on the stored map, along which the autonomous vehicle is to follow; the second information is a label associated with a portion of the estimated map to which the trajectory corresponds; and determining the inconsistency comprises determining that the label indicates that the portion of the estimated map is designated as off-road.

E. The method as any of paragraphs A-D recites, wherein: the first information is a trajectory, determined based at least in part on the stored map, along which the autonomous vehicle is to follow; the second information is associated with encoded information associated with the estimated map; and determining the inconsistency comprises determining that the trajectory crosses a lane encoded in the estimated map while associated with an intent other than a lane change intent.

F. A system comprising: one or more processors; and one or more non-transitory computer-readable media storing instructions, that when executed by the one or more processors, cause the system to perform operations comprising: receiving sensor data associated with an environment in which an object is positioned; generating, based at least in part on the sensor data, an estimated map of the environment, wherein the estimated map is encoded with policy information for driving within the environment; comparing first information associated with a stored map of the environment with second information associated with the estimated map to determine whether the stored map is consistent with the estimated map; and controlling the object based at least in part on results of the comparing.

G. The system as paragraph F recites, wherein the sensor data comprises one or more of camera data or lidar data, the operations further comprising determining based on the lidar data or camera data, a top-down representation of the environment comprising at least a portion of the policy information.

H. The system as paragraph G recites, wherein policy information comprises one or more of: drivable surfaces, lane boundaries, or traffic flow indicators.

I. The system as paragraph G or H recites, wherein the sensor data comprises camera data and lidar data and the top-down representation comprises a first top-down representation associated with the camera data and a second top-down representation associated with the lidar data, the operations further comprising generating the estimated map based at least in part on combining the first top-down representation with the second top-down representation.

J. The system as any of paragraphs G-I recites, the operations further comprising: determining, based at least in part on the first information and the second information, a difference in one or more of a position or orientation of the object; and determining whether the difference meets or exceeds a threshold difference.

K. The system as paragraph J recites, wherein determining the difference comprises determining whether a pixel of the estimated map differs from a pixel of the stored map.

L. The system as any of paragraphs G-K recites, wherein the sensor data comprises camera data and wherein generating the top-down representation of the environment comprises: re-sizing images associated with the camera data to a designated size; encoding the images, as resized, using a first residual neural network; converting the images, as resized and encoded, from a projection view to an orthogonal view using a fully connected neural network; and decoding the images in the orthogonal view using a second residual neural network.

M. The system as any of paragraphs F-L recites, the operations further comprising: determining, based at least in part on the sensor data, a pose of the object; and accessing a portion of the stored map of the environment for the comparing based at least in part on the pose of the object.

N. The system as any of paragraphs F-M recites, the operations further comprising: determining, based at least in part on comparing the first information with the second information, a confidence score, wherein the confidence score indicates at least one of: that a trajectory associated with the object, determined based at least in part on the stored map, is on a drivable surface of the estimated map; that the trajectory will cross a lane line; that a pose of the object is reliable; or that information associated with the stored map is reliable; and determining whether the stored map is consistent with the estimated map based at least in part on the confidence score.

O. The system as paragraph N recites, the operations further comprising: comparing the confidence score with a threshold; and determining that the stored map is inconsistent with the estimated map based at least in part on the confidence score being at or below the threshold.

P. One or more non-transitory computer-readable media storing instructions, that when executed by one or more processors, cause the one or more processors to perform operations comprising: receiving sensor data associated with an environment in which an object is positioned; generating, based at least in part on the sensor data, an estimated map of the environment, wherein the estimated map is encoded with policy information for driving within the environment; comparing first information associated with a stored map of the environment with second information associated with the estimated map to determine whether the stored map is consistent with the estimated map; and controlling the object based at least in part on results of the comparing.

Q. The one or more non-transitory computer-readable media as paragraph P recites, wherein the policy information encoded in the estimated map comprises at least one of a driving lane, a driving lane line, a parking lane, a speed limit, a traffic flow indicator, an indication of a drivable surface, or an indication of a non-drivable surface.

R. The one or more non-transitory computer-readable media as paragraph P or Q recites, wherein the sensor data comprises lidar data and camera data, the operations further comprising generating the estimated map based at least in part on: generating, based at least in part on the lidar data, a first top-down representation of the environment; generating, based at least in part on the camera data, a second top-down representation of the environment; and combining the first top-down representation and the second top-down representation, wherein the estimated map comprises an average of the first top-down representation and the second top-down representation.

S. The one or more non-transitory computer-readable media as any of paragraphs P-R recites, the operations further comprising: determining, based at least in part on comparing first information with the second information, a confidence score, wherein the confidence score indicates: that a trajectory associated with the object, determined based at least in part on the stored map, is on a drivable surface of the estimated map; that the trajectory will cross a lane line; that a pose of the object is reliable; or that information associated with the stored map is reliable; and determining whether the stored map is consistent with the estimated map based at least in part on the confidence score.

T. The one or more non-transitory computer-readable media as any of paragraphs P-S recites, wherein the object is an autonomous vehicle, and controlling the object based at least in part on results of the comparing comprises at least one of: causing the autonomous vehicle to stop; causing the autonomous vehicle to decelerate; causing the autonomous vehicle to use the estimated map instead of the stored map for determining how to control the autonomous vehicle; or causing the autonomous vehicle to modify a trajectory along which the autonomous vehicle is to drive.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
receiving lidar data and camera data associated with an environment in which an autonomous vehicle is positioned;
determining a top-down representation of the environment comprising policy information, the top-down representation comprising a first top-down representation associated with the lidar data and a second top-down representation associated with the camera data;
generating, based at least in part on combining the first top-down representation and the second top-down representation, an estimated map of the environment, wherein the estimated map is encoded with policy information for driving within the environment;
comparing first information associated with a stored map of the environment with second information associated with the estimated map;
determining, based at least in part on the comparing, an inconsistency between the estimated map and the stored map; and
controlling the autonomous vehicle based at least in part on the inconsistency.

2. The method as claim 1 recites,
wherein the estimated map comprises an average of the first top-down representation and the second top-down representation.

3. The method as claim 1 recites, wherein:
the first information is a first road marking in the stored map;
the second information is a second road marking, corresponding to the first road marking, on the estimated map; and
determining the inconsistency comprises:
    determining a difference between the first road marking and the second road marking; and
    determining that the difference meets or exceeds a threshold.

4. The method as claim 1 recites, wherein:
the first information is a trajectory, determined based at least in part on the stored map, along which the autonomous vehicle is to follow;
the second information is a label associated with a portion of the estimated map to which the trajectory corresponds; and
determining the inconsistency comprises determining that the label indicates that the portion of the estimated map is designated as off-road.

5. The method as claim 1 recites, wherein:
the first information is a trajectory, determined based at least in part on the stored map, along which the autonomous vehicle is to follow;
the second information is associated with encoded information associated with the estimated map; and determining the inconsistency comprises determining that the trajectory crosses a lane encoded in the estimated map while associated with an intent other than a lane change intent.

6. A system comprising:
one or more processors; and
one or more non-transitory computer-readable media storing instructions, that when executed by the one or more processors, cause the system to perform operations comprising:
  receiving camera data and lidar data associated with an environment in which an object is positioned;
  determining a top-down representation of the environment comprising policy information, the top-down representation comprising a first top-down representation associated with the camera data and a second top-down representation associated with the lidar data;
  generating, based at least in part on combining the first top-down representation with the second top-down representation, an estimated map of the environment, wherein the estimated map is encoded with the policy information for driving within the environment;
  comparing first information associated with a stored map of the environment with second information associated with the estimated map to determine whether the stored map is consistent with the estimated map; and
  controlling the object based at least in part on results of the comparing.

7. The system as claim 6 recites, wherein the policy information comprises one or more of:
drivable surfaces,
lane boundaries, or
traffic flow indicators.

8. The system as claim 6 recites, the operations further comprising:
  determining, based at least in part on the first information and the second information, a difference in one or more of a position or orientation of the object; and
  determining whether the difference meets or exceeds a threshold difference.

9. The system as claim 8 recites, wherein determining the difference comprises determining whether a pixel of the estimated map differs from a pixel of the stored map.

10. The system as claim 6 recites, wherein determining the first top-down representation of the environment comprises:
  re-sizing images associated with the camera data to a designated size;
  encoding the images, as resized, using a first residual neural network;
  converting the images, as resized and encoded, from a projection view to an orthogonal view using a fully connected neural network; and
  decoding the images in the orthogonal view using a second residual neural network.

11. The system as claim 6 recites, the operations further comprising:
  determining, based at least in part on at least one of the camera data or the lidar data, a pose of the object; and
  accessing a portion of the stored map of the environment for the comparing based at least in part on the pose of the object.

12. The system as claim 6 recites, the operations further comprising:
  determining, based at least in part on comparing the first information with the second information, a confidence score, wherein the confidence score indicates at least one of:
    that a trajectory associated with the object, determined based at least in part on the stored map, is on a drivable surface of the estimated map;
    that the trajectory will cross a lane line;
    that a pose of the object is reliable; or
    that information associated with the stored map is reliable; and
  determining whether the stored map is consistent with the estimated map based at least in part on the confidence score.

13. The system as claim 12 recites, the operations further comprising:
  comparing the confidence score with a threshold; and
  determining that the stored map is inconsistent with the estimated map based at least in part on the confidence score being at or below the threshold.

14. The system as claim 6 recites, wherein the estimated map comprises an average of the first top-down representation and the second top-down representation.

15. One or more non-transitory computer-readable media storing instructions, that when executed by one or more processors, cause the one or more processors to perform operations comprising:
  receiving lidar data and camera data associated with an environment in which an object is positioned;
  generating, based at least in part on the lidar data, a first top-down representation of the environment;
  generating, based at least in part on the camera data, a second top-down representation of the environment
  generating, based at least in part on combining the first top-down representation with the second top-down representation, an estimated map of the environment, wherein the estimated map is encoded with policy information for driving within the environment;
  comparing first information associated with a stored map of the environment with second information associated with the estimated map to determine whether the stored map is consistent with the estimated map; and
  controlling the object based at least in part on results of the comparing.

16. The one or more non-transitory computer-readable media as claim 15 recites, wherein the policy information encoded in the estimated map comprises at least one of a driving lane, a driving lane line, a parking lane, a speed limit, a traffic flow indicator, an indication of a drivable surface, or an indication of a non-drivable surface.

17. The one or more non-transitory computer-readable media as claim 15 recites,
  wherein the estimated map comprises an average of the first top-down representation and the second top-down representation.

18. The one or more non-transitory computer-readable media as claim 15 recites, the operations further comprising:
  determining, based at least in part on comparing first information with the second information, a confidence score, wherein the confidence score indicates:
    that a trajectory associated with the object, determined based at least in part on the stored map, is on a drivable surface of the estimated map;

that the trajectory will cross a lane line;
that a pose of the object is reliable; or
that information associated with the stored map is reliable; and
determining whether the stored map is consistent with the estimated map based at least in part on the confidence score.

19. The one or more non-transitory computer-readable media as claim 15 recites, wherein the object is an autonomous vehicle, and controlling the object based at least in part on results of the comparing comprises at least one of:
causing the autonomous vehicle to stop;
causing the autonomous vehicle to decelerate;
causing the autonomous vehicle to use the estimated map instead of the stored map for determining how to control the autonomous vehicle; or
causing the autonomous vehicle to modify a trajectory along which the autonomous vehicle is to drive.

* * * * *